July 23, 1968 S. TAKACH 3,393,625
AIR HEATERS
Filed March 1, 1966
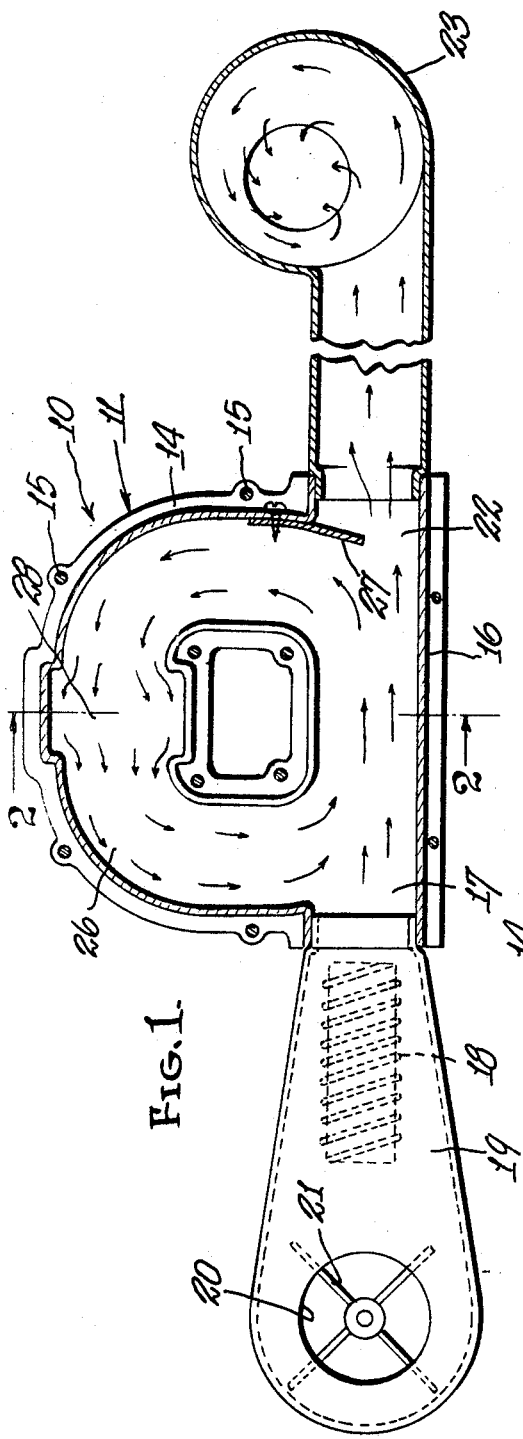
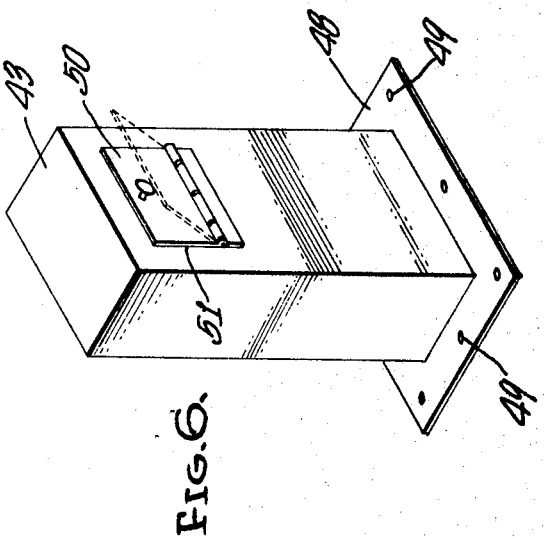
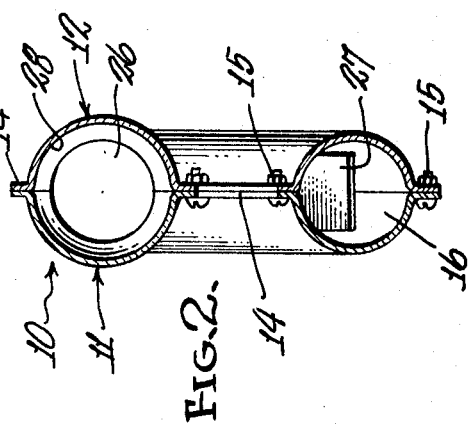
INVENTOR.
SIGMUND TAKACH
BY
*Williams and Kirsch*
ATTORNEYS

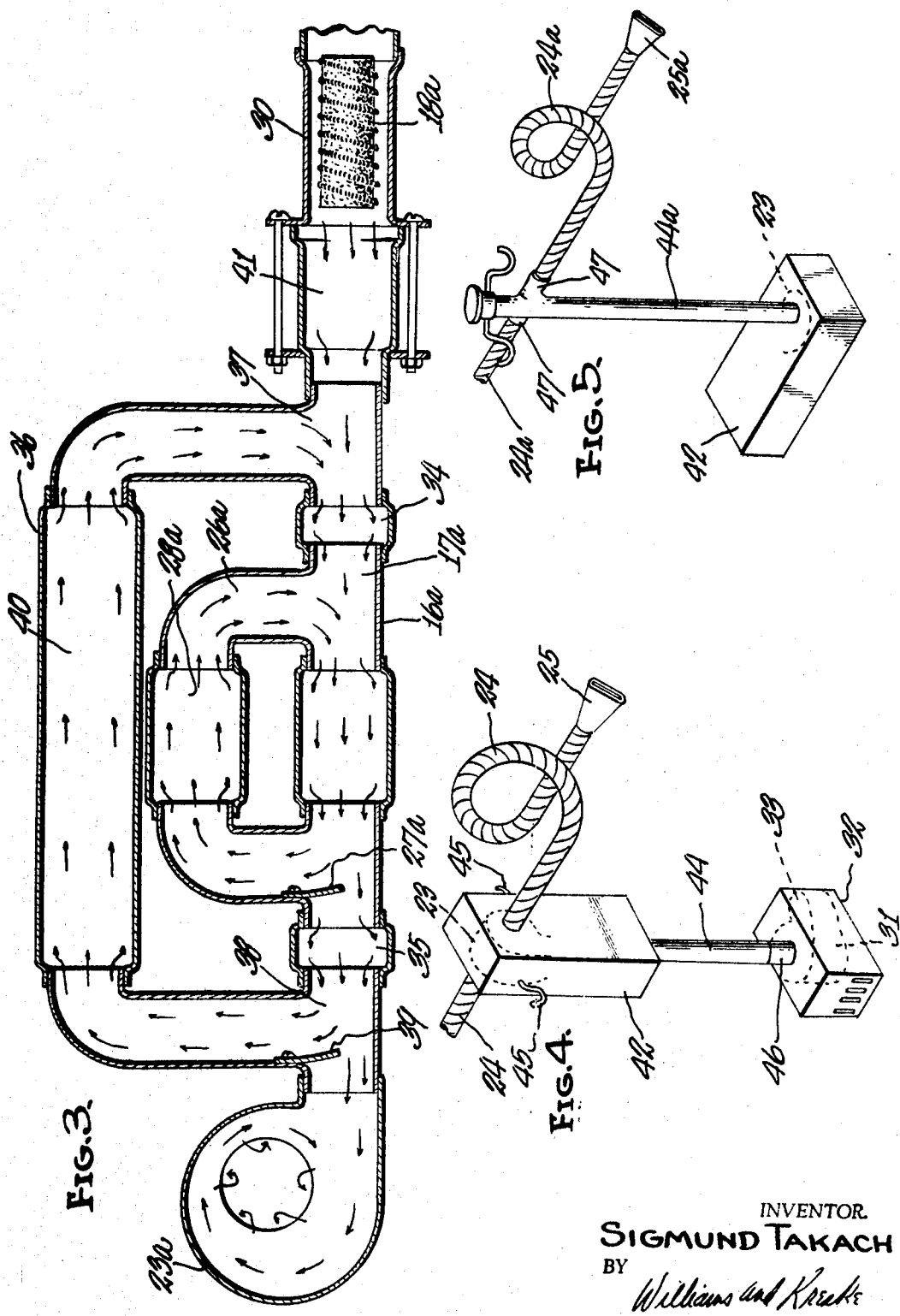

United States Patent Office 3,393,625
Patented July 23, 1968

3,393,625
AIR HEATERS
Sigmund Takach, P.O. Box 546,
Youngstown, Ohio 44507
Filed Mar. 1, 1966, Ser. No. 530,946
3 Claims. (Cl. 98—2)

ABSTRACT OF THE DISCLOSURE

An air heater wherein the heated air passes through a conduit and is recirculated therein to effect commingling of the air in the conduit with heated air entering the conduit. The heater is adaptable for heating the interior of vehicles at drive-in movies and when so used in housed, with a speaker unit, in a cabinet. A flexible hose extends out of the cabinet from the outlet of a centrifugal casing and has its outlet adapted to be positioned within a vehicle.

My invention relates to an air heater, and particularly to an air heater for use in heating the interior of an automobile parked at a drive-in threater, and the principal object of my invention is to provide new and improved heaters of this character.

In the drawings accompanying this specification and forming a part of this application, there are shown embodiments which my invention may assume, and in these drawings:

FIGURE 1 is a fragmentary sectional view of an air heater showing an embodiment of my invention, FIGURE 2 is a transverse section corresponding generally to the line 2—2 of FIGURE 1, FIGURE 3 is a fragmentary sectional view of another embodiment of my invention, and FIGURES 4 through 6 show the invention as particularly suited for use in heating the interior of an automobile parked at a drive-in theater.

Referring particularly to the embodiment of the invention disclosed in FIGURES 1 and 2, my improved air heater comprises a casing 10 which may be longitudinally split so as to be conveniently formed of two sections 11, 12 in order to adapt the housing to mass production methods. Thus, for example, the two sections may be formed as stampings or die castings and provided with flanges 14 at their meeting surfaces for the reception of connecting bolts 15.

The casing provides a conduit section 16 having one end 17 connected to a source of heat of any suitable type. Because of the convenience in electrical power distribution, I presently prefer to use electric heat and therefore the source of heat herein shown is an electric heating coil 18 located in the exhaust portion 19 of a blower. As will be evident, air enters the inlet opening 20 of the blower and is moved to and through the exhaust portion by means of fan blades 21 which are rotated by an electric motor (not shown).

The opposite end 22 of the conduit section 16 is connected an air expansion chamber which is in the form of a centrifugal fan casing 23 (with fan omitted) the conduit 22 being connected to the peripheral opening of the casing and the axial opening of the casing being adapted to deliver heated air to a space to be heated. The latter space may be a room or it may be the interior of an automobile, in which case a flexible tubing 24 (see FIGURE 4) preferably leads the heated air to an outlet nozzle 25 of the type usually found in drive-in installations.

As seen in FIGURE 1, a branch conduit section 26 is provided an receives heated air from the conduit section 16 at a point in the latter adjacent to the outlet end 22 thereof and returns such air to the conduit section at its inlet 17 which, as is evident, is closer to the source of heat. To assist in directing air from the conduit section 16 to the branch section 26, a deflector plate 27 extends downwardly to cover about the upper half of the conduit section at a point adjacent to the outlet 22. Preferably, the deflector plate 27 is curved to assist in smoothly directing the air into the branch section 26.

From the foregoing, it will be clear that the heated air is recirculated through the branch conduit section 26 until sufficient pressure builds up to cause exhaust of the air through the outlet 22. Preferably, a slight expansion chamber 28 is formed about mid-way in the branch conduit 26 to cause an expansion and subsequent contraction of the air to further assist in a commingling of the air particles.

The heated air exhausting from the outlet 22 enters the casing 23 and expands and is given a swirling motion on its way to the place to be heated.

The embodiment of the invention shown in FIGURE 3 is a further refinement of the invention just disclosed in that it provides two branch conduit sections communicating with the main conduit section. As shown, this embodiment includes some structure similar to that hereinbefore described and like reference numerals with the suffix "a" will be used to designate similar parts.

The conduit section 16a has its inlet 17a connected to receive air passing over a source of heat, such as the electric heater 18a. Any suitable type of blower may be utilized to move the air through the heater housing 30 and the heater 18a may be the sole source of heat or may be a supplementary source and the main source may be a heating pot 31 (see FIGURE 4) located in the base 32 which is presently shown as the base for a drive-in heater installation. A motor driven blower 33 forces air through the heating pot 31 and the air thus heated may be delivered to the inlet 17 (or 17a) of the casing 10 (or 10a), or to the housing for the heater 18 or the housing 30 for the heater 18a.

A branch conduit section 26a is connected to the main conduit section 16a, as before, and deflector plate 27a directs air into the branch conduit section. An air expansion chamber 28a is formed in the branch conduit, and small air expansion chambers 34, 35 are formed respectively, at the inlet 17a and outlet 22a of the conduit section 16a.

A second branch conduit section 36 receives air from the main conduit section 16a outwardly of the small air expansion chambers 34, 35 at places 37, 38, and a second deflector plate 39 is positioned at the place 38 to deflect air into the second branch conduit section 36. A relatively large air expansion chamber 40 is formed in the central portion of the second branch conduit section 36 and, if desired, an air expansion chamber 41 may be formed in advance of the conduit place 37. It will be appreciated that air flowing through the main conduit section 16a at the place 37 and at the inlet 17a will create a low perssure zone at these places to induce air to return to the main conduit section from the branch conduit sections.

The casing 10 (or 10a) may be exposed to the space to be heated so that heat radiating from such casings may be additionally utilized to heat the space. On the other hand, and particularly in drive-in theater installations, it is preferred to cover these casings with suitable heat insulation which may be of any commercially available type and therefore is not shown.

The insulated casings may be selectively disposed within an oblong sheet metal housing 42 (see FIGURES 4 and 5) or in an oblong housing 43 of the type shown in FIGURE 6, all of which are particularly adapted for drive-in theater installation. In FIGURE 4, the casing 42 is disposed in upright relation and supported on a tubular standard 44 which extends upwardly from the ground, or upwardly from the base 32 which may have suitable attachment with the ground. In the latter case, the tubular standard serves to deliver heated air from the pot 31 to the inlet 17 of FIGURE 1, or the heater housing 30 of FIGURE 3. The housing 42 may be buried in the ground and if it carries the air blower, suitable air delivery means will be provided.

Still referring to FIGURE 4, a flexible tube 24 is connected to and receives heated air from the axial openings on opposite sides of the centrifugal casing 23 (or 23a) for respectively delivering heated air to the interior of two automobiles parked on opposite sides of the housing 42. Suitable hooks 45 may be carried by the housing to hold the nozzle 25 when not in use, and switch means (not shown) of any suitable commercial design may be utilized to effect control of the blower motors and electric heaters. In some cases it has been found desirable to embody the hooks 45 as part of the switch means along the line of the hooks used to hold telephone receivers so that an electrical circuit is made only when a nozzle 25 is removed from its hook. A rubber coupling 46 (see FIGURE 4) may be interposed between the base 32 and the lower end of the tubular standard 44 to provide flexibility and a quick disconnection in the event a user inadvertently drives away from his parking spot without removing the nozzle 25 from his automobile.

In FIGURE 5, the housing 42 is disposed flat on the ground and a tubular standard 44a extends upwardly from the centrifugal casing 23 (or 23a) located within the housing. The upper end of the standard has oppositely directed outlets 47 to which the flexible hoses 24a are connected.

In FIGURE 6, the housing 43 rests upon and is secured to a support plate 48 which has openings 49 through which spikes may be driven into the ground. The housing 43 has a trap door 50 on either side, the door preferably being spring-pressed to close the respective opening 51 in the housing. The flexible hoses and connected nozzles, as well as the usual speaker found at drive-in theaters, are housed within the upper part of the housing 43, and the proper nozzle and speaker may be removed from the housing by opening the respective trap door. Thus, all parts are protected from the elements when not in use.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. An air heater comprising means for heating the air, a conduit for receiving the heated air and delivering it to a place of use, said conduit having a branch adapted to receive the heated air from one point in said conduit and return it to said conduit at a second point rearward of said one point and closer to said heating means, thus causing a recirculation of said air and a commingling of the same with incoming heated air, an expansion chamber in series relation with said conduit wherein the heated air may expand before it is delivered to the place of use, said expansion chamber being in the form of a centrifugal casing with the heated air entering at the peripheral opening of said casing and exiting through the casing axial opening.

2. The construction of claim 1 wherein said air heater is adapted for use in a drive-in theater and includes a flexible hose having one end connected to and receiving heater air from the axial opening of said fan casing and a delivery nozzle at its other end adapted to deliver air to the interior of an automobile parked at said theater.

3. An air heater adaptable as a heater for a vehicle at a drive-in movie, comprising means for heating the air, a conduit for receiving the heater air, a flexible hose connected to said conduit for delivering the heated air to the interior of said vehicle, said conduit having a branch adapted to receive the heated air from one point in said conduit and return it to said conduit at a second point rearward of said one point and closer to said heating means, thus causing a recirculation of said air and a commingling of the same with the incoming heated air, the foregoing apparatus and a speaker unit being housed within a cabinet and the latter supported on the ground area adjacent to the parked vehicle, said cabinet having a door-controlled opening through which said speaker unit and said hose may be withdrawn from said cabinet.

References Cited

UNITED STATES PATENTS

| 1,888,242 | 11/1932 | Sholtes | 98—33 |
| 1,902,575 | 3/1933 | Nichols | 98—33 |
| 2,198,449 | 4/1940 | Atkins | 98—33 |
| 2,746,372 | 5/1956 | Smith | 98—2 |

MEYER PERLIN, *Primary Examiner.*